(12) United States Patent
Goldsmith

(10) Patent No.: US 6,412,516 B1
(45) Date of Patent: Jul. 2, 2002

(54) DRY SHUT-OFF CARTRIDGE

(75) Inventor: Peter J. Goldsmith, Houston, TX (US)

(73) Assignee: Gardner Denver, Inc., Quincy, IL (US)

( * ) Notice: Subject to any disclaimer, the term of this patent is extended or adjusted under 35 U.S.C. 154(b) by 0 days.

(21) Appl. No.: 09/503,293

(22) Filed: Feb. 14, 2000

(51) Int. Cl.$^7$ ............................................. F16K 27/02
(52) U.S. Cl. .................... 137/454.6; 251/282
(58) Field of Search .................... 137/454.5, 454.6; 251/282

(56) References Cited

U.S. PATENT DOCUMENTS 5,349,982 A  *  9/1994  Goldsmith ............... 137/454.5
5,423,348 A  *  6/1995  Jezek et al. ............... 137/454.6
5,975,429 A  *  11/1999  Jezek

* cited by examiner

Primary Examiner—Stephen M. Hepperle
(74) Attorney, Agent, or Firm—Robert F. I. Conte; Lee, Mann, Smith, McWilliams, Sweeney & Ohlson

(57) ABSTRACT

A valve control system for regulating fluid flow in a high pressure system, the control mechanism including a valve slidable within a cartridge, said cartridge carrying a seat, said valve being movable between a first position permitting high pressure fluid flow from a source to the exit of a gun, to a second position blocking passage of said fluid through said exit.

8 Claims, 4 Drawing Sheets

DRY SHUT-OFF CARTRIDGE

BACKGROUND OF THE INVENTION

Control mechanisms have long been used to control the flow of fluid under pressure, through guns, in the water blasting art. Disposal of the excess and the used water has become a problem, to the environment. Applicant's assignee hereof, is also the owner of U.S. Pat. No. 5,349,982, which is directed to some of the features possessed by this invention, such as quick maintenance. However, said prior patent's gun was "wet," i.e., it exhausted excess fluids through a dump tube. Applicant's need is to duplicate the control, yet keep it "dry," i.e., no exhaustion into the nearby environment.

SUMMARY OF THE INVENTION

Hand held Control Guns used in water blasting applications fall into two basic categories, either "Dump Type" or "Dry Shut-off Type." The dump type is the gun/control mechanism for which we obtained our previous patent (U.S. Pat. No. 5,349,982), and it dumps water at low pressure through a valve when a trigger is released. This is a very simple device, which has the disadvantages of being wasteful of water, and also of tending to increase the clean-up effort required, because the water, which is dumped, usually mixes with debris being removed from the surfaces being cleaned. The dry shut-off type gun does not dump water when the trigger is released, it simply cuts off the flow at the gun, and the unused flow of water is diverted to the inlet side of the pump, usually into a header tank (a reservoir tank from which the pump can take its supply of water). The diversion of the flow is achieved by means of a separate "Unloader Valve," which is not part of the current invention, but is a type of pressure relief valve. When flow is blocked at the gun, the pressure in the system tends to increase to levels above a chosen operating range. The excess pressure is released by the unloader valve, which is spring biased towards a closed position. The valve is moved off its seat by the overpressure, which releases some of the flow, thereby reducing the pressure to a level, which has been preset by adjusting the force on the spring.

The valve control mechanism, which is the subject of the current invention, bears a family resemblance to the dump valve being a similar type of device. When a trigger is pulled the valve is lifted off its seat allowing water to pass through the seat area and to flow down the barrel of the gun and exit at high pressure through a nozzle. When the trigger is released, the valve reseats itself and water ceases to flow from the nozzle and no further water is seen in the vicinity of the gun. Dry shut-off guns of many different formats are available on the market, but the major advantage of this design is the ease of overhaul of the gun by combining all of the wear components into a single cartridge, which can be replaced in the field very easily.

Since we received our original patent on the dump-type cartridge, there have been some changes in the external appearance of the guns, but the principles of their operation have remained unchanged. The cartridge is now mounted vertically in the gun, and the extension of the trigger now pivots below the gun and swings upwards to operate the valve. This applies to the dump gun and also to the dry shut-off gun, which will be described below.

DESCRIPTION OF THE INVENTION

Figure 3:
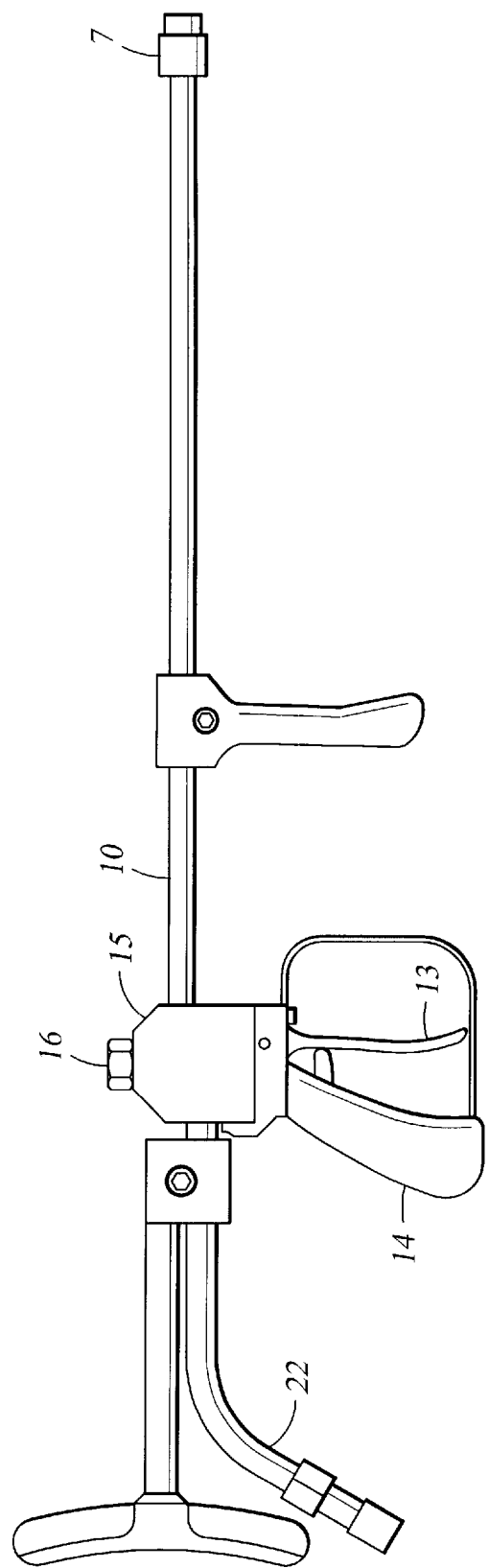
FIG. 3 is a partial perspective of the complete gun, with the cartridge hidden from view.
Figure 4:
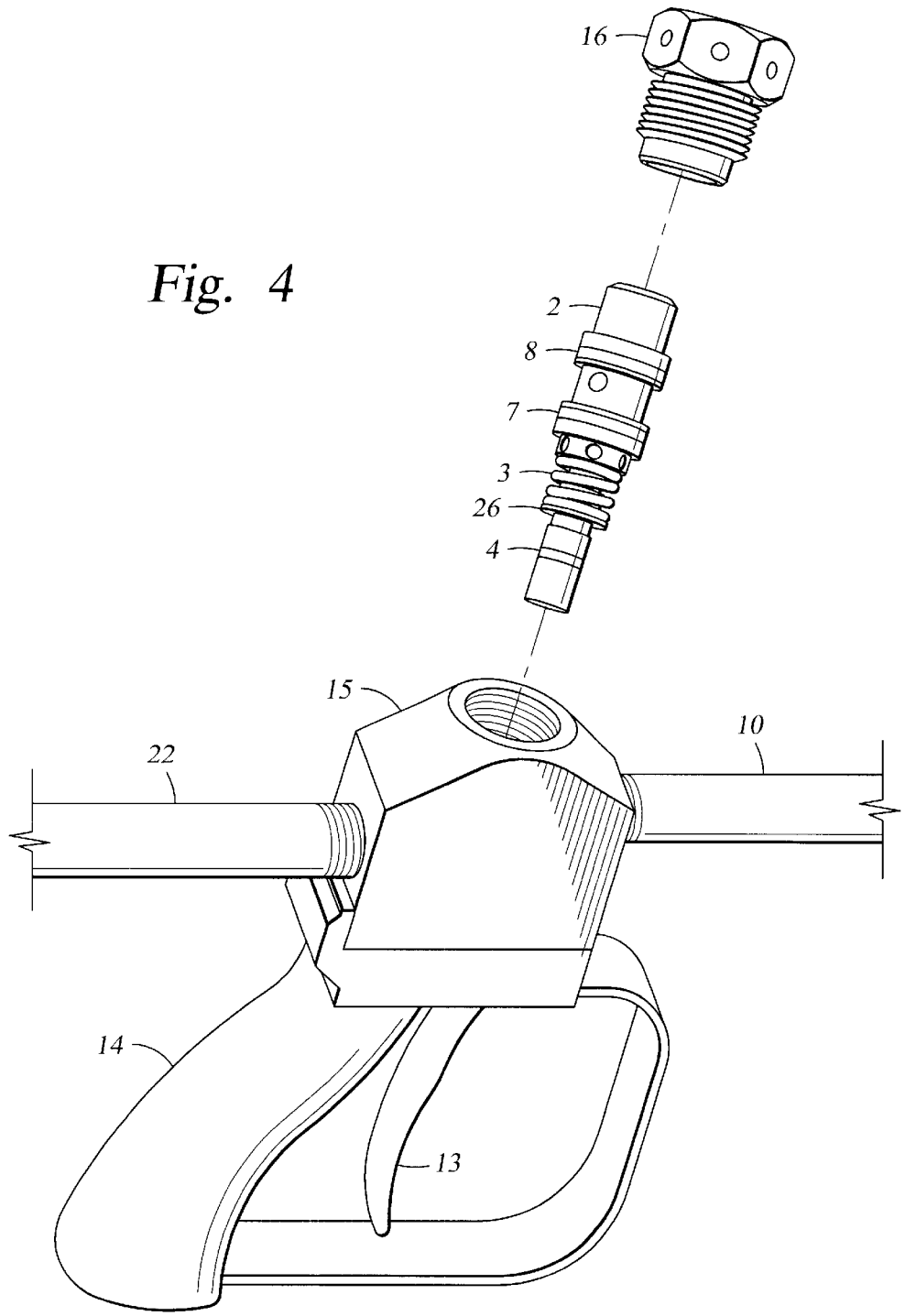
FIG. 4 is an exploded perspective of the handle, cartridge and cartridge holder.

FIG. 3 illustrates, somewhat sketchily, a typical gun, modified so as to accommodate, this invention. The gun includes inlet 22, outlet nipple 10, nozzle holder 7, block 15, cartridge holder 16, from which depends the cartridge of this invention. Additionally, the gun includes trigger 13 and handle 14.

Figure 1:
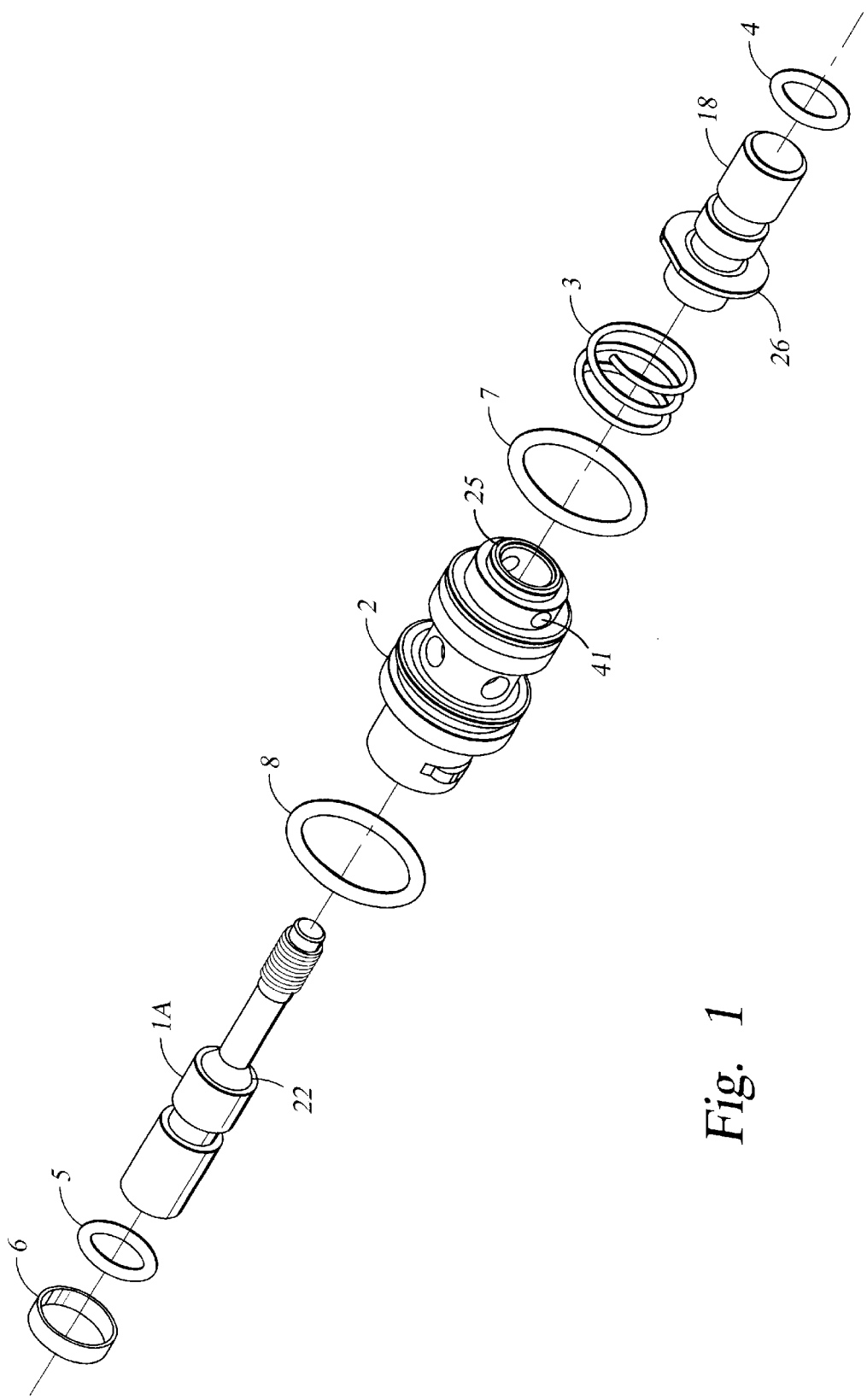
FIG. 1 is an exploded perspective of the two-part valve and of the valve cartridge.
Figure 2:
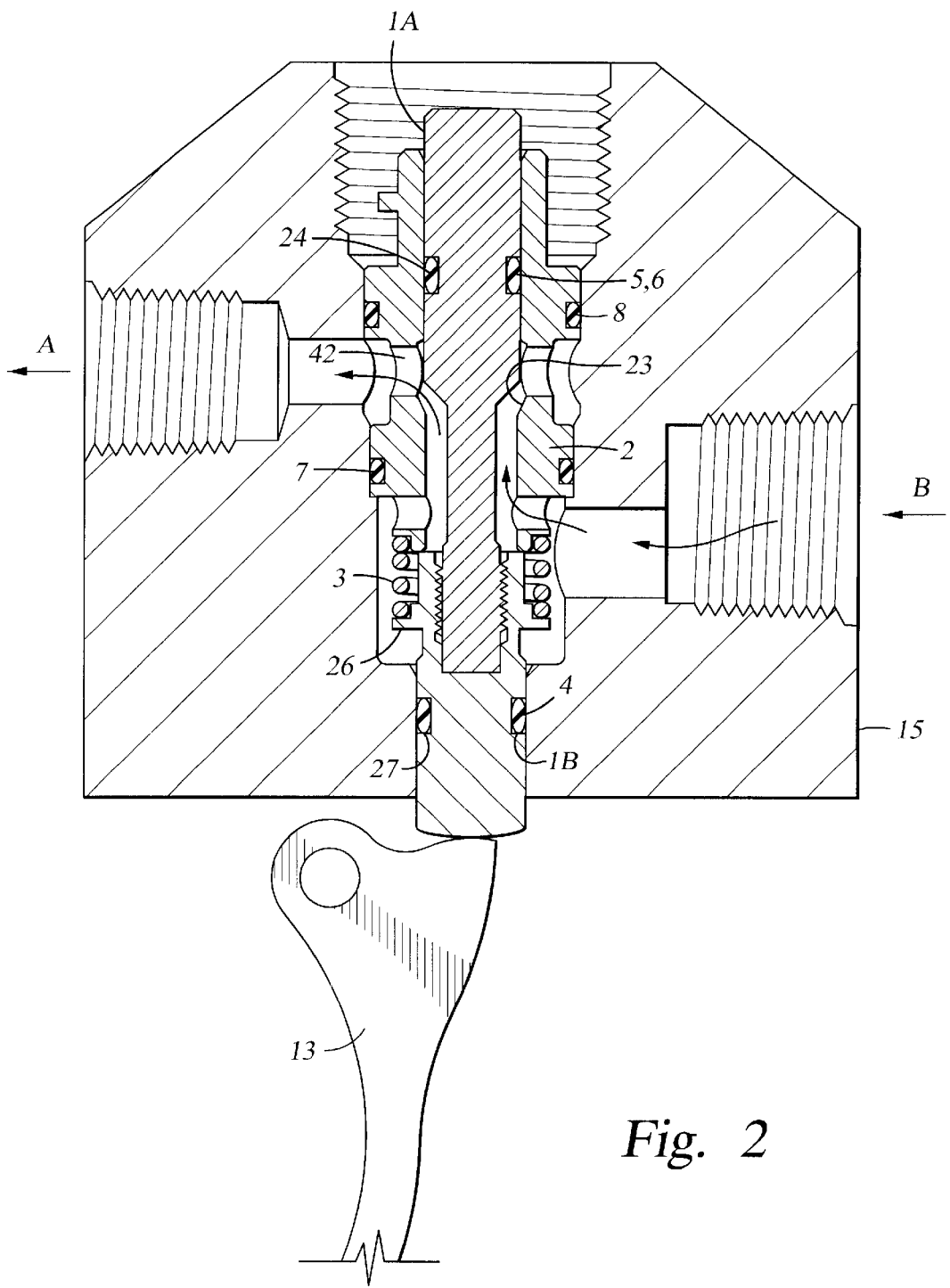
FIG. 2 is a vertical section through the assembled valve and cartridge installed in the gun block, with the trigger activated so as to permit the high pressure fluid to pass through the gun.

Referring to FIG. 1, the valve consists of two cylindrical parts, male threaded portion (1A) and female threaded portion (1B). Part (1A) slides into a smooth bore, the cartridge body (2), and the seat 22 formed on part (1A) seals against a mating seat 23 formed inside part (2) as shown in FIG. 2. The valve part (1A) is sealed against the bore in the cartridge body (2) by seals (parts 5 and 6) located in a groove 24 formed in part (1A). The threaded end of valve part (1A) is smaller in diameter than the seat formed inside the cartridge body (2) and passes through the seat and protrudes beyond the end of the cartridge body (2), adjacent to the spring (3). The spring (3) is located against the end of the cartridge body (2) by a raised ring 25 formed on the cartridge body (2). The second part of the valve part (1B) is threadedly connected to part (1A). Screwing valve part (1A) into valve part (1B) compresses the spring (3) between the end of the cartridge body and a flange 26 formed on valve part (1B), which serves to pull the seat on valve part (1A) into sealing engagement with the seat formed inside the valve body part (2). The seal (4), which installs in a groove 27 in valve part (1B), is used to seal part (1B) against the bore in the gun block. This is discussed later in connection with FIG. 2. The two seals (7) and (8) fit into grooves on the outside of the cartridge body (2), and seal against bores in the gun block. This is also discussed in connection with FIG. 2.

FIG. 2 shows an assembled cartridge installed in a gun block. The trigger has been activated, which has lifted the valve assembly (parts 1A and 1B) causing the seat 22 on the valve part (1A) to disengage from the seat 23, inside the cartridge body (2). This allows the high pressure water to flow through the inlet holes 41 in the cartridge body (2), then upwards in the direction of arrows A through the annulus formed by the hole through the cartridge body seat and the stem of the valve part (1A), then through the disengaged seat and out of the discharge holes 42 in the cartridge body (2) and from there down the barrel of the gun (not shown).

When the trigger is released, the valve assembly (parts 1A and 1B) moves downwards due to the force of the spring (3), and the seat on part (1A) seals against the seat inside the cartridge body 2. In fact the force of the spring (3) is not sufficient to cause the two seating surfaces to seal completely. Additionally downward force, which completes the sealing process, is achieved by arranging for the valve part (1B) to be approximately 0.010 (ten thousandths) of an inch greater in diameter than part (1A). (Part (1A) may be 0.363" dia. and part (1B) 0.373" dia.) This means that when the valve seat seals against the seat in the cartridge body (2) the area exposed to the water pressure (say 15,000 psi.) by valve part $(1A) = 0.363^2 \times pi./4 = 0.10349$ ins$^2$, which gives an upward (i.e. off seat) force of 1,552 pounds. The downward force resulting from the water pressure acting on the exposed area of valve part (1B)=$0.373^2 \times pi./4 = 0.10927$ resulting in a downward (ie. seating) force of 1639 pounds. This difference in area gives a net seating force in addition to the spring of 1639−1552=87 pounds. This ensures a tight seal.

The seals (7) and (8) seal against bores inside the gun block and isolate the discharge side of the cartridge from the high pressure water which is held back by the closed seat. The seal (4) seals valve part (1B) against the bore in the gun block. When the valve parts (1A) and (1B) are assembled by screwing part (1A) into part (1B) they are prevented from coming apart by using an epoxy glue applied to the threads before joining them.

Although only a single embodiment has been described, it should be understood that numerous modifications would be possible by one skilled in the art without departing from the spirit of the invention, the scope of which is limited only by the following claims.

What is claimed is:

1. A value control system for a high pressure, water blast gun, including:
   value means and cartridge sealably positionable within the block of a trigger-controlled gun;
   sold cartridge having first seat means for sealing engagement with said value means;
   said valve means having a value seal for sealing with said gun block; and
   wherein said value means comprises engageable male and female segments.

2. The control system of claim 1 wherein said system includes inlet means and outlet means for fluid under high pressure, and passageway means linking said inlet and said outlet means.

3. The control system of claim 1 wherein said valve means includes second seat means for sealing engagement with said first seat means of said cartridge.

4. The device of claim 3, and including means for controlling the flow of said fluid between said inlet means and said outlet means.

5. The device of claim 4 wherein controlling means includes both said first seat means and second seat means possessed by said valve means.

6. The device of claim 5 wherein said controlling means also includes spring means for releasably sealing said first and said seat means.

7. The device of claim 6 wherein said spring means seats against said cartridge and against said female segment of said valve means.

8. A valve control system for a high pressure, water blast gun, including:
   valve means and a cartridge sealably positionable within the block of a trigger-controlled gun;
   a portion of said valve means external to said cartridge, said portion of said valve means external to said cartridge in fluid contact with an amount of fluid when fluid has passed into said gun block; and
   wherein said valve means comprises engageable male and female segments.

* * * * *